(12) United States Patent
Watanabe et al.

(10) Patent No.: US 6,333,613 B1
(45) Date of Patent: Dec. 25, 2001

(54) SERVO SYSTEM CONTROL DEVICE AND CONTROL METHOD

(75) Inventors: Kanji Watanabe; Ikuo Nagamatsu, both of Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/623,988

(22) PCT Filed: Mar. 8, 1999

(86) PCT No.: PCT/JP99/01128

§ 371 Date: Nov. 17, 2000

§ 102(e) Date: Nov. 17, 2000

(87) PCT Pub. No.: WO99/46648

PCT Pub. Date: Sep. 16, 1999

(30) Foreign Application Priority Data

Mar. 12, 1998 (JP) .................................... 10-061448

(51) Int. Cl.$^7$ .............................. G05B 19/05; G05B 19/12
(52) U.S. Cl. ......................... 318/568.1; 318/601
(58) Field of Search ............... 318/567, 568.1, 318/569, 570, 578, 600, 601

(56) References Cited

U.S. PATENT DOCUMENTS

| | | | |
|---|---|---|---|
| 3,974,432 | * 8/1976 | Thompson | 318/562 |
| 4,142,246 | * 2/1979 | Fumihiko et al. | . |
| 4,743,900 | * 5/1988 | Rohrle | 340/870.01 |
| 5,600,221 | * 2/1997 | Tomatsuri et al. | 318/632 |
| 6,113,461 | * 9/2000 | Onoda et al. | 451/5 |
| 6,246,201 | * 6/2001 | Aderek et al. | 318/632 |

FOREIGN PATENT DOCUMENTS

| | | |
|---|---|---|
| 2-74185 | 3/1990 | (JP) . |
| 7-244517 | 9/1995 | (JP) . |
| 8-30313 | 2/1996 | (JP) . |

* cited by examiner

*Primary Examiner*—Bentsu Ro
(74) *Attorney, Agent, or Firm*—Armstrong, Westerman, Hattori, McLeland & Naughton, LLP

(57) ABSTRACT

A servo system controller in which motor specification data inputted through a CRT/keyboard (1) and representing the characteristics of a motor is edited into electronic cam data by a data editing section (22), the edited data is displayed in the form of a table or graph, such as a cam diagram, on a data display section (25), and the electronic cam data converted into the one of a format enabling cam motion is generated by a machine drive section and stored, comprising input data calculating means (26) for calculating the acceleration/deceleration peak torques and the rotational speed of a motor for every block of the electronic cam data, a motor specification data table (28) stored with the known motor specification data, and input judging means (27) for displaying the result of the comparison of the output of the input data calculating section (26) with the motor specification data for every block on a display section.

4 Claims, 7 Drawing Sheets

FIG.5(a)
PRIOR ART

| Name of parameters | Unit |
| --- | --- |
| Load torque converted to motor spindle : TL | (Kg - m) |
| Load GD² converted to motor spindle : GD² L1 | (Kg - m²) |
| GD² of Gear + Coupling : GD² L2 | (Kg - m²) |
| Cycle time : tc | (SEC) |
| Rated torque of motor | (Kg - m) |
| Maximum instantaneous torque of motor | (Kg - m) |
| Rated number of revolutions of motor | (r / min) |
| Maximum number of revolutions of motor | (r / min) |
| Motor spindle GD² : GD² m | (Kg - m) |
| Moving angle of motor revolution per cycle | (deg.) |
| Number of pulses of machine motion per cycle | (Pulse) |

FIG.5(b)
PRIOR ART

| Spindle moving angle per cycle | 22.5 deg. |
| --- | --- |
| Amount of machine movement per cycle | 116735 pulses |
| Number of data | 120 data |
| Cam data pattern | Deformed sine |

SERVO SYSTEM CONTROL DEVICE AND CONTROL METHOD

TECHNICAL FIELD

The present invention relates to an electronic cam system that is driven by individual drives by a motor, abolishing a mechanical cam such as an eccentric cam, in a machine having a plurality of drive axes, which drives position control between the plurality of drive axes by a mechanical cam mechanism.

BACKGROUND ARTS

Conventionally, a mechanical cam has long been used as a means for converting the rotating movement of a spindle driven by a motor, etc., to cyclical linear movement of a driven shaft. However, if, in the case of a mechanical cam, the shape of a certain cam is determined, only one type of a cyclical displacement curve (cam linear diagram) can be obtained. In order to obtain different displacement curves, it is necessary to produce a mechanical cam having a different shape to acquire a different certain displacement curve and then replace the cam with a mechanical cam of a different shape. Therefore, a great deal of preparation time has been required for production, replacement and adjustment thereof. Recently, as a means for reducing such labor and time, an electronic cam type servo system has been developed, in which a drive shaft is also driven by a servo motor, and the servo motor is controlled and driven on the basis of instructions coming from a memory section in which position data of displacement curves are stored, whereby the driven shaft is displaced in compliance with a desirable displacement curve to correspond to different displacement curves by replacing the data of the displacement curves in the memory section.

FIG. 4 is a block diagram of a control device for a prior art servo system using an electronic cam. The data inputting and processing unit 21 in a personal computer 2 receives necessary data from input devices such as a keyboard, mouse, etc., indicated by reference number 1 and from the CRT, and edits cam data in the data editing section 22. The corresponding data may be calculated by a means not described above and may be inputted by a means such as an Excel file, etc. The edited cam data are transmitted to a data display section 25 and are converted to data displayable in the form of a table or graph (cam linear diagram, etc.). And, the data are transmitted to the CRT1 by a transmission means (not illustrated) and displayed thereon. Further, the data are converted, by a cam data converting and processing section 23, to a format by which the mechanical drive section can bring about cam actions, and are further stored in a peripheral device (a hard disk) via a cam data input/output processing section 24 by which the cam data can be stored and loaded.

In connection with the detailed preparation of cam data and sequential procedures of displaying the same in the form of graphs, first, mechanical specifications as shown in FIG. 5(a), and motor specification data are inputted by the keyboard 1 as parameters necessary for calculation. As corresponding data, database linked with the types of motors may be utilized. At this time, premised conditions for cam design as shown in FIG. 5(b) are established as cam data specifications to be prepared, and are stored in a work memory of the personal computer 2.

Based on the cam data specification in FIG. 5(b), the data editing section 22 prepares, as one example of a displacement curve, a graph showing the relationship between spindle motion angles and the amount of mechanical motion, which is shown in FIG. 6. Based on the cam data specifications, the graph shows a deformed sine pattern in which the ordinate indicates the amount of mechanical motion per cycle, using six divisions in a range from 116,736 pulses to the upper limit of 120,000 pulses, and the abscissa indicates the spindle motion angles, using a graduation of 0 through 22.5 degrees, wherein, for example, an instruction of a servo motor equivalent to the displacement data per rotation of a mechanical cam and corresponding thereto is expressed, and this is called a "displacement curve diagram" (displacement curve). Also, if speed is taken as the ordinate, this is called a "speed linear diagram", and if acceleration is taken as the ordinate, this is called a "acceleration linear diagram". These are generally called "cam linear diagrams".

Next, based on setting of the cam data specifications in FIG. 5(b), the data are divided into 120 sections, and differences between the respective data of the amounts of mechanical motions adjacent to each other are taken, the time acquired by dividing the time of one cycle=tc by the number of data, 120, is used, whereby 1/120 cycles is regarded as one block unit, and the speed per block can be calculated. Using the data, a graph showing the relationship between the spindle motion angles and the mechanical motion speed is prepared as in FIG. 7. These cam linear diagrams maybe subjected to further detailed modifications in compliance with the motion of a machine, the finished states of products, etc.

120 data as shown in FIG. 6 and FIG. 7 are the cam data processed in the inputting and processing section 21 and edit by the data editing section 22, and the data displaying section 25 executes a data display process in which it converts the data to correspond to an ordinate and abscissa and displays a cam linear diagram as a graph on the CRT 1 as shown in the drawings.

Finally, as one more process, the final judgement is carried out by using the following three expressions for whether or not the motor can operate with respect to the entirety of the prepared cam data.

(1). A process for judging whether or not the effective torque calculated in connection with the entirety (entire blocks) of the cam data using the prepared data is smaller than the rated torque of the motor is carried out. The effective torque Trms (Torque root means square) is obtained by the following expression (1):

$$\text{Trms} = [\{(T\alpha_1^2 \times t_1) + (T\alpha_2^2 \times t_2) + \ldots (T\alpha_m^2 \times t_2)\}/tc]^{1/2} \quad (1)$$

wherein tm is a zonal time, and tc is the time required per cycle.

(2). Next, a process for judging whether or not the acceleration and deceleration peak torque of the respective blocks, which is calculated by using the prepared cam data, is smaller than the maximum instantaneous torque of the motor is carried out after the acceleration and deceleration peak torque TQ is obtained by the following expression (2):

$$T\alpha = (GD^2_L + GD^2_M)/375 \times \{N(m) - N(m-1)\}/tm \quad (2)$$

where N(m) and N(M−1) are zonal speeds (pulse values).

(3). Judgement as to whether or not the number of revolutions of the entirety of the respective blocks calculated by using the prepared cam data exceeds the number of revolutions of the motor is carried out. The number (NB) of times of revolutions of the blocks is obtained by the following expression (3):

$$NB\{(m)-(m-1)\} = N(m) - N(m-1) \quad (3)$$

The final judgement is carried out by manual calculations or calculation using a separate calculation table program, etc., on the basis of the calculations made by the abovementioned expressions (1), (2) and (3), and comparison between the results of the calculation of the respective expressions and the motor specifications.

However, in the abovementioned prior art example, a great deal of time is required in the procedures for performing a re-examination where the prepared cam data are amended at site since a series of calculations are composed of many steps, wherein labor and time are excessively required for design and adjustment, thereby resulting in a problem in that it is hard to shorten the preparation time.

DISCLOSURE OF THE INVENTION

It is therefore an object of the invention to provide a servo system control device and control method, which are capable of shortening the design time, adjustment time and preparation time, in which when checking the prepared cam data, the motor capacity required to enable cam motion by means of cam data in advance is simultaneously calculated, its availability is announced, and these procedures are carried out on line for each of the blocks of cam data, thereby simplifying the procedure for correcting the cam data and remarkably shortening the time for matching the data to actual situations.

Therefore, the invention according to claim 1 is a servo system control device in which necessary data are inputted from the particulars of a machine and motor specifications by a data inputting section, electronic cam data are edited by a data editing section, the edited results are converted into the form of a table or graph and outputted in a data display section, and at the same time, are outputted to a cam data converting section that can convert the edited results in a form that enables cam motions, which comprises an inputted data calculation means for calculating various data for each of blocks of electronic cam data; a motor specification data table in which already known motor specification data are stored; and an input judgement means for displaying, on a display section, the results by comparing and judging the results of calculations of the inputted data calculation means with the motor specification data block by block, and performing instruction by announcement.

Also, the invention according to claim 2 is featured in that, in addition to a servo system control device as set forth in claim 1, various data calculated by the abovementioned inputted data calculating means is at least one of (1) peak torque of acceleration/deceleration, and (2) the number of revolutions of a motor..

Further, the invention according to claim 3 is featured in that, in addition to the servo system control device as set forth in claim 1, the abovementioned input data calculating means calculates the effective torque with respect to the entirety of the blocks after calculating the abovementioned various data block by block, and where the results of the calculation are greater than the rated torque, the results of the calculation are displayed on the display section, and are instructed by announcement.

In addition, the invention according to claim 4 is a method comprising the steps of inputting necessary data from machine specifications and motor specifications; editing electronic cam data, displaying the data in the form of a table or graph; preparing and storing electronic cam data by converting the data to a format by which cam motion is enabled, wherein, by block-by-block on-line processing of the electronic cam data displayed on a display when preparing and correcting the electronic cam data, at least one of (1) whether or not the effective torque of motor is smaller than the rated torque of the motor, (2) whether or not the peak torque of acceleration/deceleration is smaller than the maximum instantaneous torque of the motor, and (3) whether or not the number of revolutions is smaller than the maximum number of revolutions of the motor is calculated and compared, and the result of comparison is announced.

Therefore, processes for calculation and comparison of the peak torque of acceleration/deceleration and the number of revolutions are carried out for each of the blocks of the electronic cam data displayed on a display. After that, processes for calculation and comparison of the effective motor torque are further carried out throughout all the blocks, wherein the result of comparison is displayed on a display, checking of the electronic cam data can be carried out in further detailed steps than in the prior arts, and as soon as the result of comparison is displayed, the availability of the cam data is announced. Therefore, it is possible for designers of electronic cam data to shorten the examination time for judging whether or not the prepared electronic cam data are optimal, and the design efficiency can be improved. Further, it does not become necessary to separately examine whether or not the motor can operate as per data when preparing or correcting the electronic cam data as in the prior arts, whereby it is possible to shorten the preparation time of the electronic cam data necessary to prepare the optimal electronic cam data by which the maximum capacity of the motor can be fully displayed.

BRIEF DESCRIPTION OF THE DRAWINGS

FIGS. 5(a) and 5(b) are views showing the specifications of prior art motors.

BEST MODE FOR CARRYING OUT THE INVENTION

Figure 1:
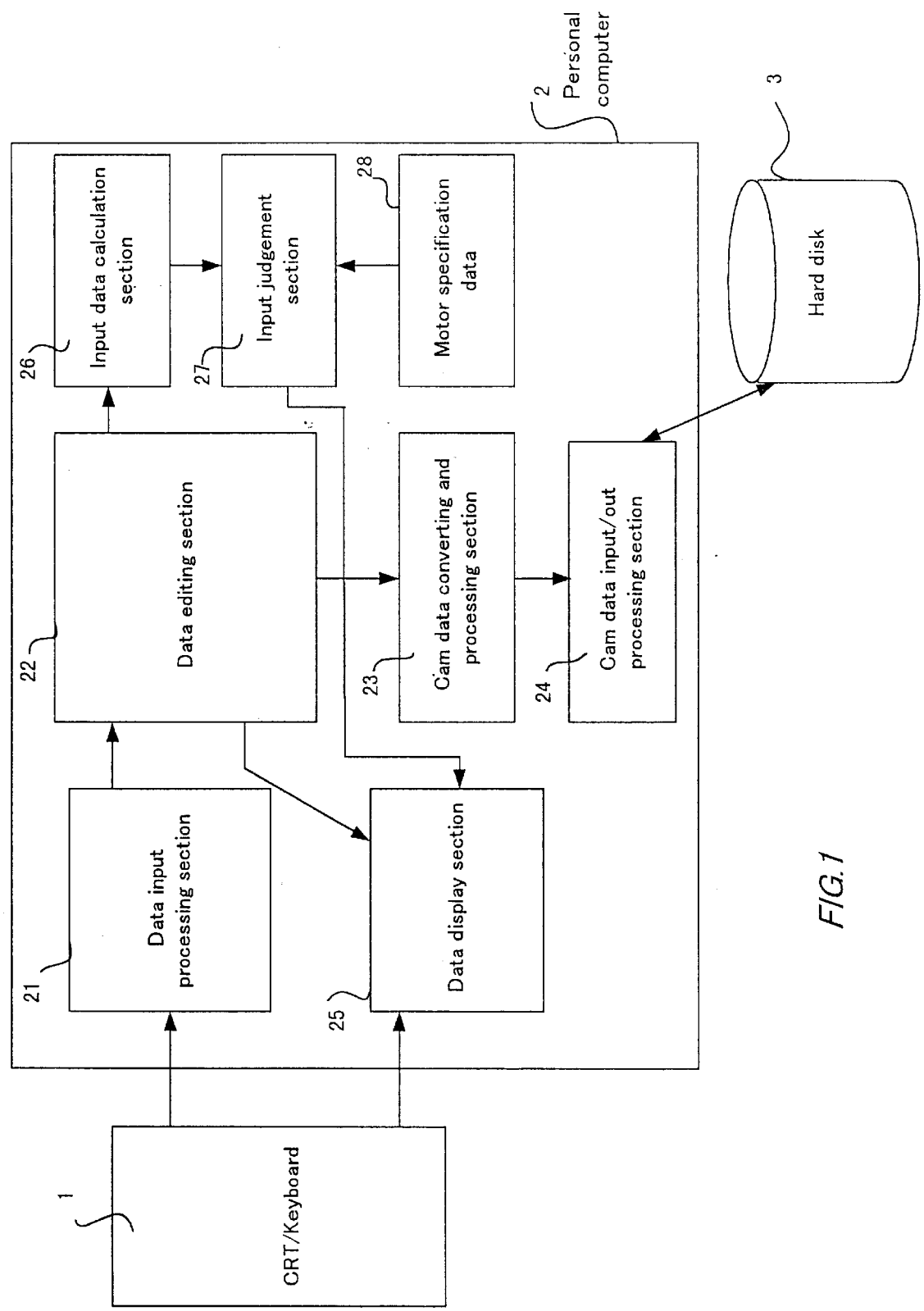
FIG. 1 is a block diagram of a servo system control device according to a preferred embodiment of the invention.
Figure 2:
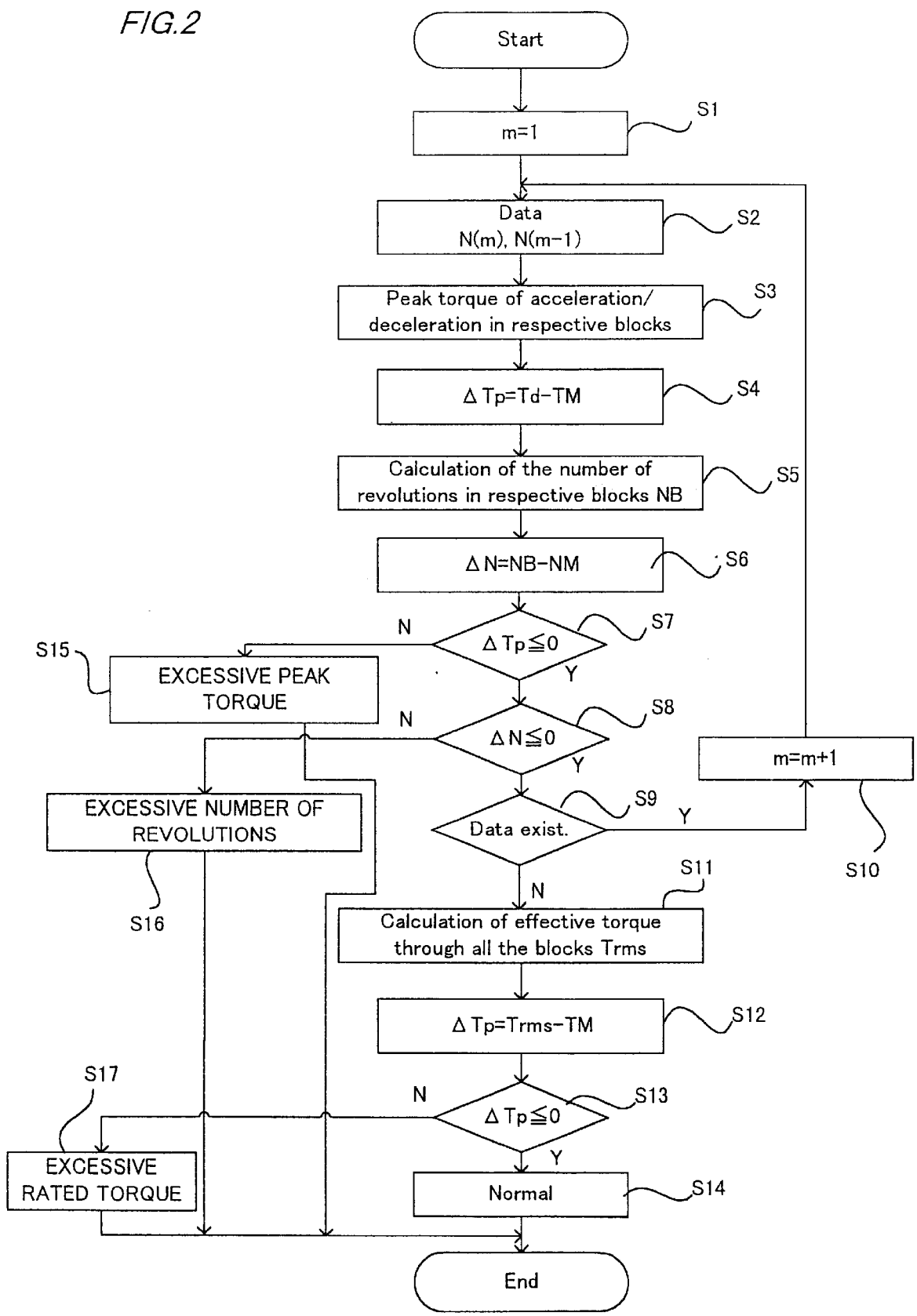
FIG. 2 is a flow chart of a process of the control device shown in FIG. 1.
Figure 3:
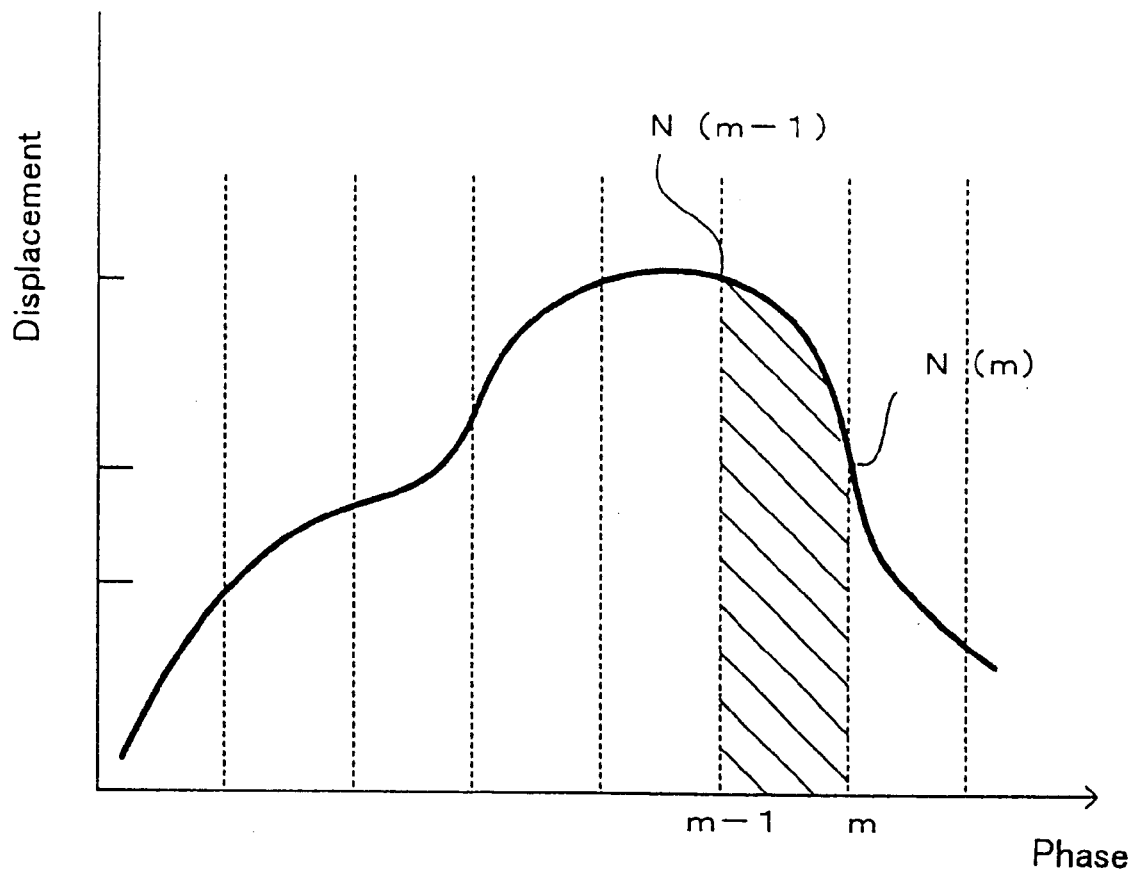
FIG. 3 is an explanatory view of cam data to be processed in FIG. 2.

FIG. 1 is a block diagram of a servo system control device according to an embodiment of the invention. FIG. 2 is a flow chart of a process of the control device shown in FIG. 1. FIG. 3 is an explanatory view of cam data processed in FIG. 2.

In FIG. 1, an input data calculation section 26 carries out calculation of input data, wherein the effective motor torque, etc. to operate a cam as per the electronic cam data is calculated. Motor specification data 28 is a type of table in which the motor specifications are stored, and the contents thereof are data as shown in FIG. 5 and other specification data, etc. An input judgement section 27 compares the result of calculation by the input data calculation section 26 with the already known motor specification data 28 for judgement, and the availability of the results of calculation is displayed on a CRT via the data display section 25, and the result thereof is announced.

Figure 4:
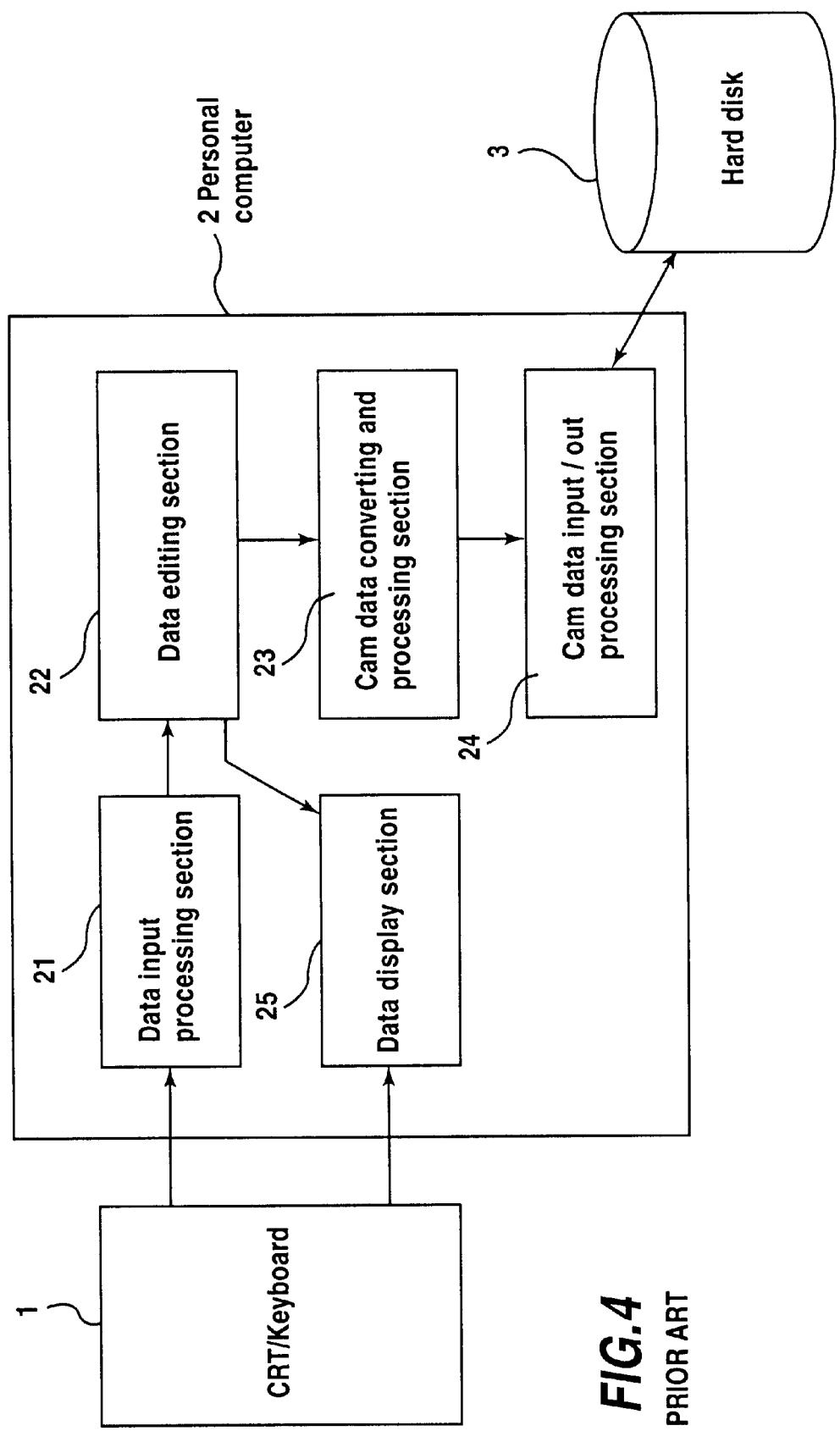
FIG. 4 is a block diagram of a prior art servo system control device.
Figure 6:
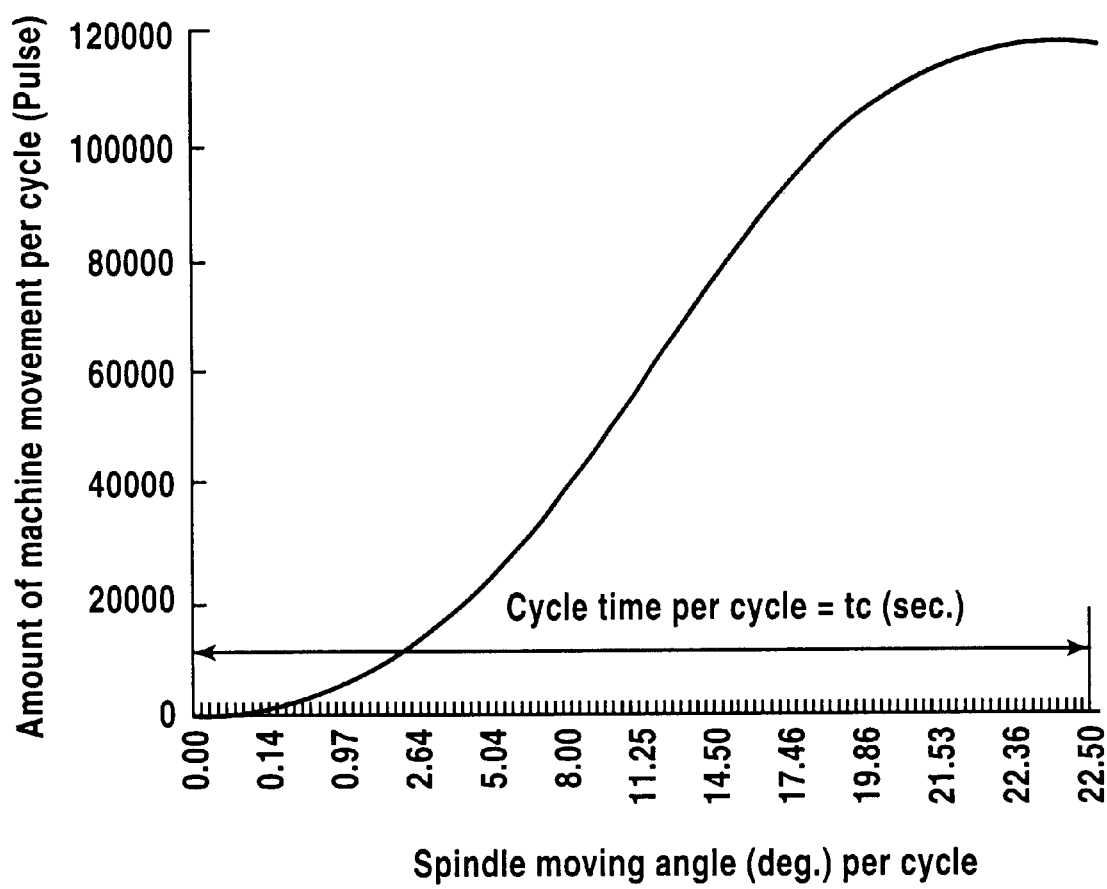
FIG. 6 is a displacement curve diagram of a prior art cam linear diagram.
Figure 7:
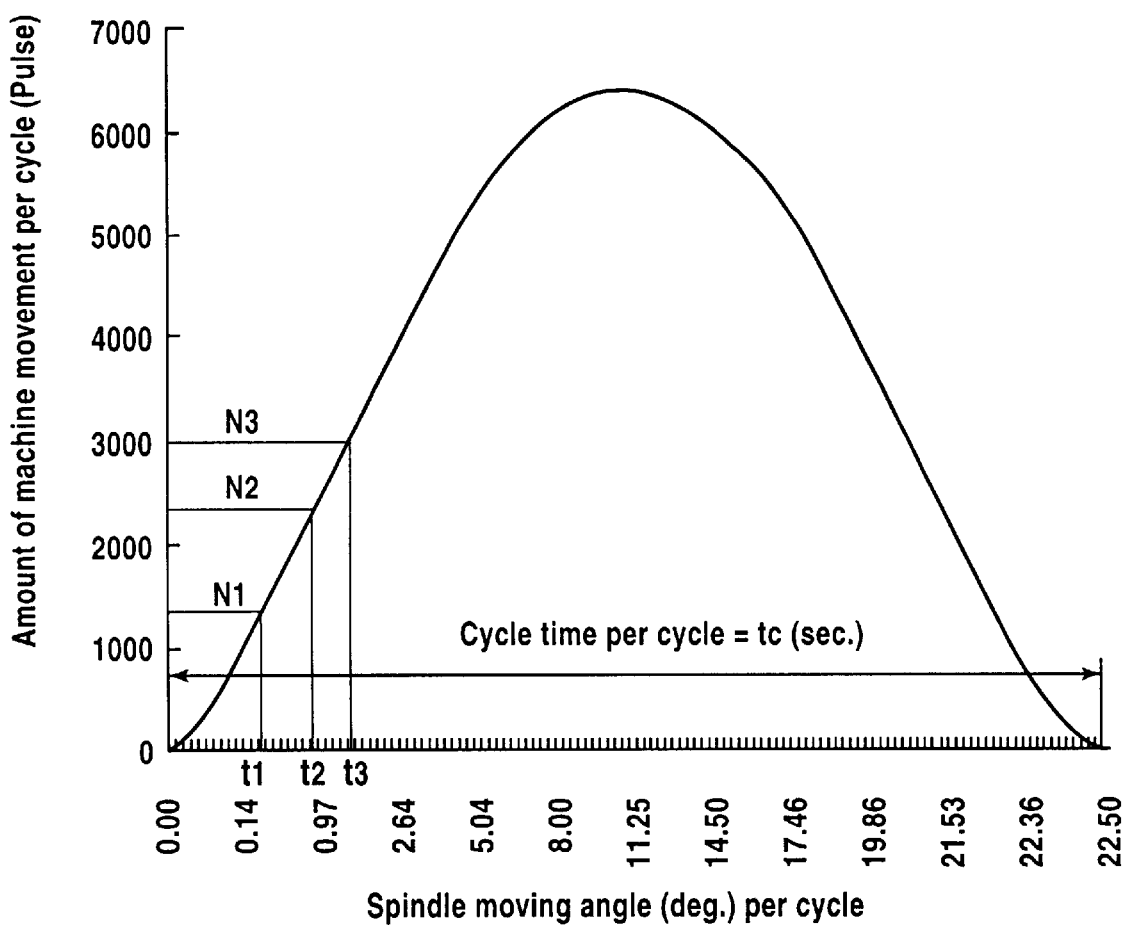
FIG. 7 is a view showing a speed linear diagram of a prior art cam linear diagram.

Also, the other parts which are identical to those of the prior art example shown in FIG. 4 are given the same reference numbers. That is, the data input processing section 21 in a personal computer 2 receives necessary data from an input device such as a keyboard or a mouse, and from the CRT 1, and edits cam data in the data editing section 22, wherein the edited cam data therein are transmitted to the data display section 25, and are converted to data which can be displayed in the form of a table or graph. After that, the data are transmitted to and displayed on the CRT 1. The mechanical drive portion converts the data to a format, which enables cam motion, through the cam data converting and processing section 23, and the data are stored in a peripheral device 3 such as a hard disk via the cam data input/output processing section 24 which stores and loads the cam data.

Next, a description is given of motions with reference to FIG. 2.

(1). First, the cam data are processed block by block. The present process block is m block because m=1 (Process step 1, hereinafter referred to as "S1").

Herein, one block which is a processing unit is, as shown in FIG. 3, an area which is enclosed by the zonal speed= m−(m−1) and phases m and m−1, which are obtained by the number of pulses, etc., in the zonal speed=m−(m−1)/zonal time, based on the displacement values of the ordinate corresponding to phase points m and m−1 of the abscissa.

(2). As to the cam data of m block, the peak torque Tα of acceleration/deceleration of the m block is calculated (S3), based on N(m) and N(m−1) (S2).

(3). $\Delta Tp = T\alpha - TM$ is continuously calculated to make judgement (S4). The TM in this case is the maximum instantaneous torque of the motor, which can be obtained by the motor specifications. Since calculation of such peak torque TQ of acceleration/deceleration, etc., is carried out by the input data calculation section 26, the calculation expression depends on the expression (2) shown in the prior art example. However, without depending on manual calculation or a separate calculation table program as in the prior art example, it is quickly carried out as an on-line process by an internal program.

(4). Next, the number NB of revolutions of the m block is calculated (S5). The number of revolutions is calculated by the expression (3) shown in the prior art example.

(5). $AN = NB - NM$ is continuously calculated (S6). However, the NM is the maximum number of revolutions of the motor, which can be obtained by the motor specifications.

(6). Next, the process shifts to a judgement process made by the input judgement section 27. Judgement is made as to whether the $\Delta Tp$ is smaller than or equal to 0 (that is, $\Delta Tp \leq 0$) (S7).

(7). If YES, judgement is made as to whether the AN is smaller than or equal to 0 (that is, $AN \leq 0$) (S8).

(8). If this also is YES, judgement is made as to whether or not the input data of the electronic cam data remains (S9).

(9). If it remains, m=m+1 is established, and the next block is calculated (S10).

(10). If no data remains, the effective torque Trms is calculated throughout all the blocks (S11). The calculation is carried out by the expression (1) shown in the prior art example.

(11). Subsequently, $\Delta T = Trms - TM$ is calculated (S12). However, The TM is the rated torque of the motor, which can be obtained by the motor specifications.

(12). Judgement is made as to whether the $\Delta T$ calculated in S12 is smaller than or equal to 0 (That is, $\Delta T \leq 0$) (S13).

(13). If YES, it is judged that the data are normal and correct, and the data are registered as electronic cam data (S14).

(14). If the judgement in S7 is $\Delta TP > 0$, that is, the judgement is NO, it is processed as EXCESSIVE PEAK TORQUE (S15).

(15). Where the judgement in S8 is $\Delta N > 0$, that is, the judgement is NO, it is processed as EXCESSIVE NUMBER OF REVOLUTIONS (S16).

(16). Where the judgement in S13 is $\Delta T > 0$, that is, the judgement is NO, it is processed as EXCESSIVE RATED TORQUE (S17).

(17). In the case of S15, S16 or S17, the cam data exceeds the rating of the motor, wherein normal and correct cam motion is not guaranteed. Therefore, a warning is announced, and further the degree of excess is displayed to give warning.

(18). If the EXCESSIVE RATED TORQUE is received, a correcting process is carried out on the basis of the CRT display. However, in the cam data correcting process, the displacement curve can be corrected by a simple operation such as dragging from point N(m−1) to point N(m) in FIG. 3 using a mouse. The cam data at the respective points corresponding to the corrected curve are renewed, and a judgement is also carried out, as shown in FIG. 2, block by block in the correct zone.

According to such an embodiment of the invention, calculation is carried out block by block, including the calculations of expressions (1) through (3) shown in the flow chart of FIG. 2, and the cam data are compared with and judged on the basis of the motor specifications. Then, the data are displayed. Therefore, it becomes possible for a designer to accurately judge, in a short time, whether or not the corrected cam data are the optimal data, whereby the time of preparation and correction of the electronic cam data can be shortened. Further, since it is possible to pick up the results of actual operation of the servo system on the basis of the prepared cam data from the control device side and to display the results on the same CRT display screen on line, it is possible to instantaneously check whether or not re-correction is required.

INDUSTRIAL APPLICABILITY

As has been described above, according to the invention, examination as to whether or not the motor motion is enabled when preparing or correcting electronic cam data can be simply carried out, and it is possible to generate optimal electronic cam data. Therefore, there are excellent effects by which the design time can be shortened, and adjustment can be easily achieved.

What is claimed is:

1. A servo system control device in which necessary data are inputted from the particulars of a machine and motor specifications by a data inputting section, electronic cam data are edited by a data editing section, the edited results are converted into the form of a table or graph and outputted in a data display section, and at the same time, are outputted to a cam data converting section that can convert the edited results in a form that enables cam motions, comprising:

an inputted data calculation means for calculating various data for each of blocks of electronic cam data;

a motor specification data table in which already known motor specification data are stored; and an input judgement means for displaying, on a display section, the results by comparing and judging the results of calculations of the inputted data calculation means with the motor specification data block by block, and performing instructions by announcement.

2. A servo system control device as set forth in claim 1, wherein various data calculated by said inputted data calculating means is at least one of (1) peak torque of acceleration/deceleration, and (2) the number of revolutions of a motor.

3. A servo system control device as set forth in claim 1, wherein said input data calculating means calculates the effective torque with respect to the entirety of the blocks after calculating said various data block by block, and where the results of the calculation are greater than the rated torque, the results of the calculation are displayed on the display section, and are instructed by announcement.

4. A method for controlling a servo system; comprising the steps of inputting necessary data from machine specifications and motor specifications;

editing electronic cam data;

displaying the data in the form of a table or graph;

preparing and storing electronic cam data by converting the data to a format by which cam motion is enabled, wherein, by block-by-block on-line processing of the electronic cam data displayed on a display when preparing and correcting the electronic cam data, at least one of (1) whether or not the effective torque of motor is smaller than the rated torque of the motor, (2) whether or not the peak torque of acceleration/ deceleration is smaller than the maximum instantaneous torque of the motor, and (3) whether or not the number of revolutions is smaller than the maximum number of revolutions of the motor is calculated and compared, and the result of comparison is announced.

* * * * *